Jan. 31, 1928.
A. J. NOVELLI
1,657,761
ADJUSTABLE VOLUME AGGREMETER
Filed Jan. 19, 1926    2 Sheets-Sheet 1
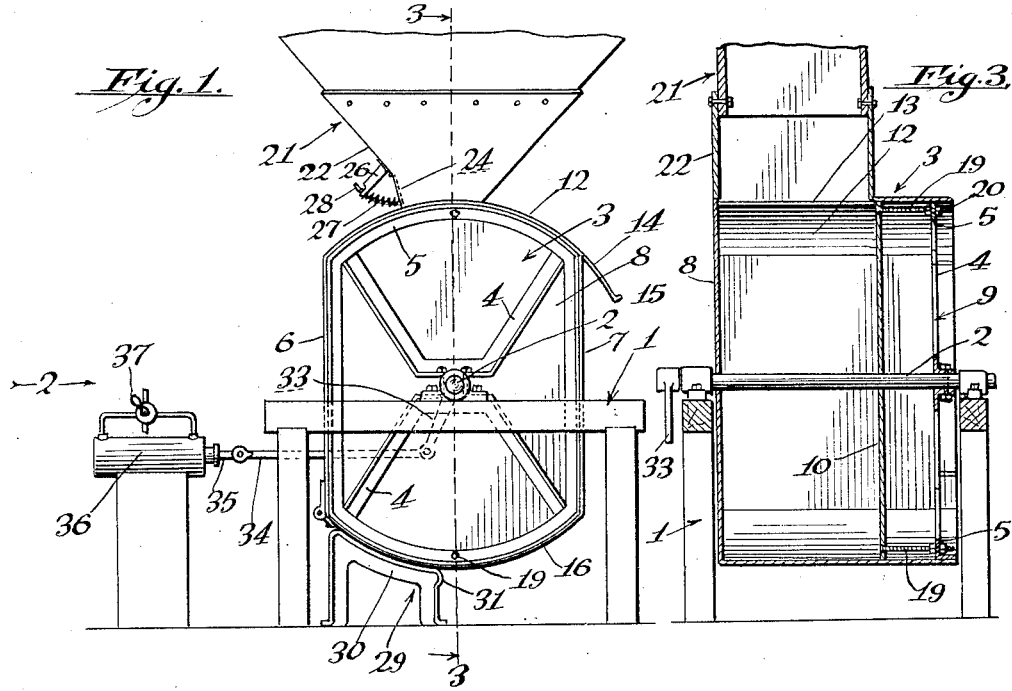

Jan. 31, 1928.
A. J. NOVELLI
1,657,761
ADJUSTABLE VOLUME AGGREMETER
Filed Jan. 19, 1926     2 Sheets-Sheet 2
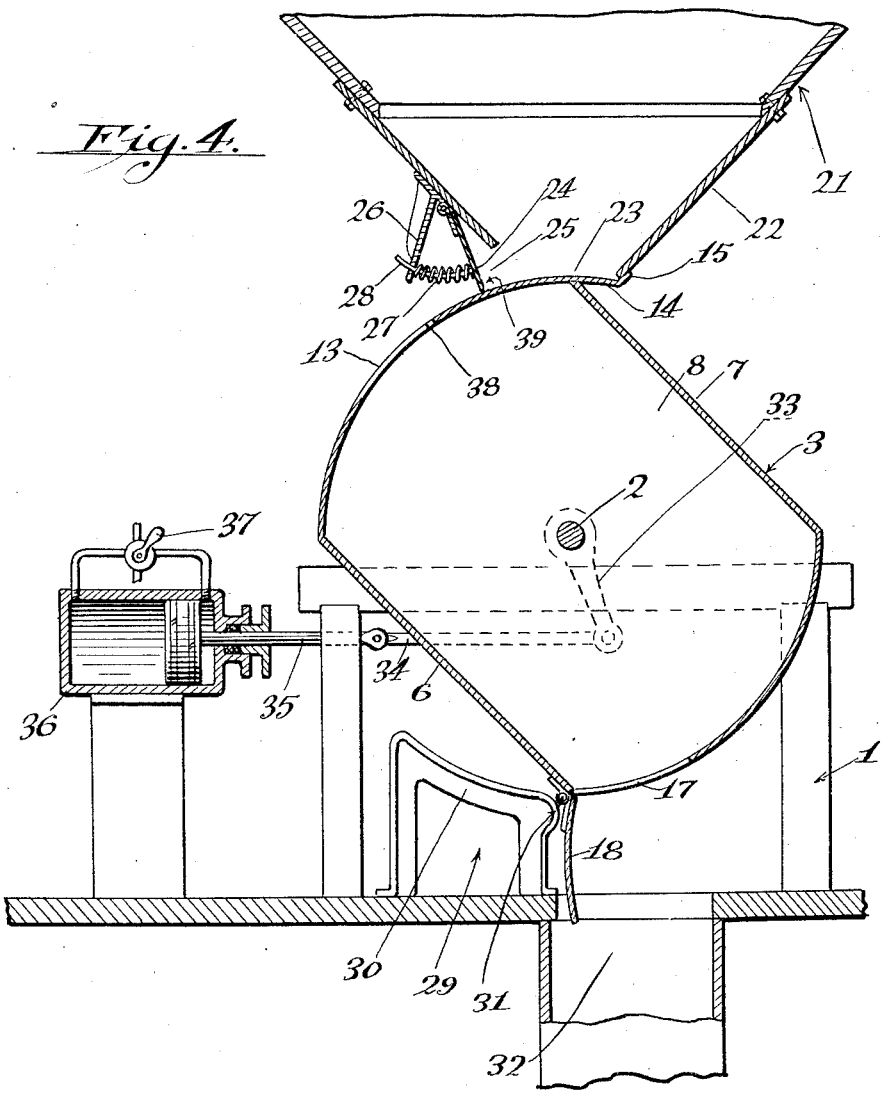

Patented Jan. 31, 1928.

UNITED STATES PATENT OFFICE.

ARCHIMEDES J. NOVELLI, OF SAN FRANCISCO, CALIFORNIA.

ADJUSTABLE VOLUME AGGREMETER.

Application filed January 19, 1926. Serial No. 82,260.

My invention is an adjustable volume aggremeter for use particularly in measuring the aggregates in mixing concrete or the like.

An object of my invention is a meter which measures volume of pulverized, granular or broken material such as cement, sand and broken stone utilized in making concrete.

A particular object of my invention is a volume meter which is mounted to rock for loading and for discharging, the meter being preferably centrally pivoted and loaded at the top and discharging at the bottom; the construction of the bottom and top of the meter being such as to close the outlet at the bottom when the meter is being charged and to cut off the charging opening from the supply when the meter is being discharged.

A further object of my invention is to mount the meter so that it may be operated by power to discharge when wanted.

Specific features of my invention are an adjustable partition for varying the volume of the meter and a pivoted hopper mouth to prevent jamming with large material.

In my construction of volume meter for dry materials I pivotally mount a tank-like device having curved upper and lower ends on an axis running through the center of the tank. A hopper discharges through a central opening in the top, filling the tank and a pivoted gate at the base allows discharge of the contents. A stool is arranged to engage the gate, closing this when the tank is in the position for filling and allowing opening when the tank is rocked; this latter operation preferably being done by a power mechanism such as a steam or air cylinder.

A partition is mounted in the tank fitting closely on all sides, being slidably mounted so as to vary the volume of the inside capacity of the tank.

My invention will be more readily understood from the following description and drawings, in which—

Figure 1 is a side elevation of my volume meter as if taken in the direction of the arrow 2 of Fig. 1.

Fig. 2 is an end elevation taken in the direction of the arrow 2 of Fig. 1.

Fig. 3 is a vertical transverse section on the line 3—3 of Fig. 1 in the direction of the arrows.

Fig. 4 is a longitudinal elevation on the line 4—4 of Fig. 2, in the direction of the arrows.

Fig. 5 is an enlarged detail of the manner of adjusting the partition for measuring volume.

The construction of the meter proper and its mounting is substantially as follows:

Any suitable framing such as designated by the numeral 1 may be utilized, having a rotatable axle 2 suitably journaled. A measuring tank indicated generally by the numeral 3 is supported on the axle and is preferably constructed with angular frame members 4 and angular peripheral members 5 joining the frame members. A tank preferably having flat ends 6 and 7, a fixed flat side 8 and an open opposite side 9 is suitably attached to the framing and to the peripheral members 5. A movable partition 10 is adjustably mounted on the angular members 5 which may be substantially the same as the framing members 4 and the peripheral members 5 on the opposite side or if desired the side 8 may be constructed as shown omitting these frame members. The tank has an arched top 12 with a central opening 13 therethrough and is provided with a curved extension 14 of the same curvature as the top having a flange 15. The base 16 is curved and has an opening 17 therein closed by a pivoted gate 18. This opening is preferably close to one of the ends of the tank. The curves of the top and bottom are formed on the radius from the axle 2.

The adjustable partition has screws 19 connected thereto at the top and bottom and other points if desired; these being threaded through lock nuts 20 which engage on the opposite sides of the angles 11 as indicated particularly in Figs. 3 and 5. These bolts are illustrated as being rigidly secured to the partition 10 and are adjusted by loosening and tightening the proper nuts to screw the partition in and out of the tank.

The hopper construction is substantially as follows, being illustrated particularly in Figs. 1, 2, 3 and 4:

The hopper is designated generally by the numeral 21, having a discharge end 22 with an open mouth 23. A flap 24 forms a closure on one side of the mouth, closing an opening 25 adjacent the lower end of the discharge end on one side. A fixed bracket 26 forms an abutment for a compression spring 27 which is coiled on a curved arm 28 attached to the flap 24. This spring normally functions to hold the flap in position, closing the opening 25. A stool 29 is suitably supported with a curved face 30 concentric with the base of the tank, this stool being placed with the nose end 31 substantially directly above a discharge chute 32 and on one side thereof.

In order to operate the meter by tilting, an arm 33 is secured to the axle 2 and by means of a connecting rod 34 is operated by the piston rod 35 of an air, steam or hydraulic cylinder 36, this latter being controlled by a control valve 37.

The operation of my volume meter for measuring broken stone or gravel is substantially as follows:

The partition 10 would be adjusted in and out of the tank by means of the screws 19 so as to have the proper internal volume desired to be measured; then when the tank is in the position of Figs. 1, 2 and 3, the material in the hopper will fill through the opening 13 into the tank until it is completely full. The valve 37 is then operated to operate the engine 36 and thereby tilt the axle and hence rock the tank. In this rocking movement the gate 18 is gradually lowered by the nose edge 31 of the stool 29 and allows the material to discharge into the chute 32 as indicated by the position of Fig. 4. The tank is preferably rocked until the gate hangs substantially vertically downwardly; thus giving a full discharge opening.

In the same rocking movement the closed portion 12 of the top cuts off the hopper, thus preventing material falling out of the hopper and thus closure is maintained by the extension 14 until the flange 15 engages the lower portion of the discharge end of the hopper, thereby bringing the tank to rest.

Should any stones of large size jam in the discharge end of the hopper as would be possible against the edge 38 of the opening 13 in the top of the tank, the flap 24 would be forced in the direction indicated by the arrow 39 in Fig. 4; thus allowing the material to free itself and preventing stoppage of the tilting motion. Sometimes a few large stones will pass underneath the flap and spill over the top of the tank but the quantity so spilled is negligible.

While I have described the construction and action of my volume meter for measuring materials of a broken nature of large sizes, such as broken stone and gravel, it is to be understood that it may be utilized for other materials, either finer or coarser. In mixing concrete I preferably mount three or more meters in proper relation to discharge into a chute leading to a concrete mixer and placed under bins containing cement, sand and stone. The partitions 10 are adjusted and the tanks are sometimes made of suitable sizes so that cement, sand and stone may be measured in the proportions required in the concrete. Therefore in one operation of the engine these aggregates are discharged into a concrete mixer in the proper proportion, these proportions being accurately measured and varied if desired by changing the position of the partitions in one or more of the tanks.

From the above description it will be seen that my meter, while of relatively simple construction may be adapted to a variety of purposes. The general construction and specific details may be considerably changed to suit different installations, such changes however would be within the spirit of my invention as set forth in the description, drawings and claims.

Having described my invention, what I claim is:

1. An adjustable volume meter for granular material comprising in combination a tiltable tank having an open side, an axle journaled at its opposite ends in a frame supporting said tank and passing through the open side, an adjustable partition forming a closure for the open side, the tank having top and bottom openings, means to oscillate the tank, means to close the bottom opening when the tank is in position for filling, the top opening being shifted out of its filling position when the tank is in discharging position.

2. An adjustable volume meter for granular material comprising in combination a tank having a flat side and arcuate top and bottom and opposite connecting ends, the top and bottom having openings therethrough, the tank being open opposite its flat side and having an adjustable partition fitted therein, a shaft journaled at its opposite ends forming a mounting for the tank extending through the flat side and partition, means to close the opening in the bottom when the tank is being filled through the top, means to tilt the tank and means to open the bottom opening to discharge the tank.

3. An adjustable volume meter for granular material comprising in combination a tank having a closed side and being open opposite said closed side, a frame secured in said open side, a shaft journaled in said side and in the frame, a partition fitting in the open side, means inter-connecting the framing and partition to adjust the partition lengthwise of the shaft, the tank having an arched top and bottom with openings therethrough, a gate pivoted to the bottom forming a closure for the bottom opening, a rigidly mounted stool having a curved face concentric with the tank bottom, to close and allow opening of the gate on tilting of the tank, and means to tilt the tank.

4. An adjustable volume meter for granular material comprising in combination a tank having substantially flat sides and curved top and bottom ends, a pivoted horizontal axle connected to the sides, the top having a centrally positioned filling opening and the bottom having a laterally positioned discharge opening, a curved pivoted gate forming a closure for the discharge opening, a hopper having a mouth adapted to register with the filling opening when the tank is in a vertical position, a stool positioned adjacent the bottom having a curved surface concentric with the bottom, the stool being adapted to support the gate in closed position when the tank is in filling position, the top of the tank being adapted to close the mouth of the hopper when in the discharging position and the stool being adapted to allow opening of the gate when in the discharging position.

5. An adjustable volume meter comprising in combination a supporting structure, an axle journaled thereon, a tank having a curved top and bottom edge formed with a curve measured from the axle as a radius, a centrally positioned filling opening in the top, a laterally positioned discharge opening in the bottom, a curved gate pivoted to one side of the discharge opening, the tank having substantially straight sides transverse of the axle, ends joining the curved top and bottom, a hopper having a mouth positioned to register with the filling opening in the vertical position of the tank, a curved stool positioned to hold the gate closed in the filling position of the tank, the top of the tank being adapted to close the mouth of the hopper when the tank is tilted and the stool being positioned to allow opening of the gate when the tank is tilted to discharge same.

In testimony whereof I have signed my name to this specification.

ARCHIMEDES J. NOVELLI.